United States Patent [19]

Modarres

[11] Patent Number: 5,059,383
[45] Date of Patent: Oct. 22, 1991

[54] SODIUM LEAK DETECTION SYSTEM FOR LIQUID METAL COOLED NUCLEAR REACTORS

[76] Inventor: Dariush Modarres, 12 La Vista Verde, Rancho Palos Verdes, Calif. 90274

[21] Appl. No.: 336,725

[22] Filed: Apr. 12, 1989

[51] Int. Cl.$^5$ .............................................. G21C 17/00
[52] U.S. Cl. ..................................... 376/250; 376/248
[58] Field of Search ................ 376/248, 250; 356/438, 356/319, 303

[56] References Cited

U.S. PATENT DOCUMENTS

| | | | |
|---|---|---|---|
| 3,969,077 | 7/1976 | Hill | 23/230 |
| 4,091,283 | 5/1978 | Sun | 250/303 |
| 4,117,396 | 9/1978 | Berkey et al. | 324/33 |
| 4,380,168 | 4/1983 | Ibe | 73/40.5 R |
| 4,886,348 | 12/1989 | Schmertz | 350/622 |

Primary Examiner—Stephen J. Lechert, Jr.
Assistant Examiner—Nina Bhat
Attorney, Agent, or Firm—Blakely, Sokoloff Taylor & Zafman

[57] ABSTRACT

A light source is projected across the gap between the containment vessel and the reactor vessel. The reflected light is then analyzed with an absorption spectrometer. The presence of any sodium vapor along the optical path results in a change of the optical transmissivity of the media. Since the absorption spectrum of sodium is well known, the light source is chosen such that the sensor is responsive only to the presence of sodium molecules. The optical sensor is designed to be small and require a minimum of amount of change to the reactor containment vessel.

6 Claims, 3 Drawing Sheets

SODIUM LEAK DETECTION SYSTEM FOR LIQUID METAL COOLED NUCLEAR REACTORS

This invention was made with Government Support under Contract No. DE-AC03-88ER80665 awarded by the Department of Energy. The government has certain rights in this invention.

BACKGROUND OF THE INVENTION

1. Field of the Invention

The present invention relates to the field of leak detection systems, and more particularly to a method and apparatus for detecting sodium leaks from a liquid metal cooled nuclear reactor.

2. Art Background

In a nuclear power reactor, power is generated through heat emanating from the nuclear core. This core must be kept within a certain temperature range or it may melt through the surrounding reactor vessel and damage the outside environment. One method of cooling a reactor core involves the use of water. The water circulates around the core and is heated to steam. This steam is passed through a turbine creating electric power. The turbine also cools the steam and condenses it back into water. This cool water is then recirculated around the core in a closed cycle.

Another method of cooling the reactor core involves the use of liquid metal. Typically, liquid sodium is chosen because of its superior material properties. The use of liquid sodium has many advantages over water cooled reactors. The use of sodium decreases the probability of neutrons-which are generated by the core-slowing down, and thus increases the average neutron kinetic energy and reduces the neutron absorption. All of these factors increase the efficiency with which the reactor produces power. The pool of liquid sodium also acts as a large heat sink, providing thermal stability to damp out any temperature oscillations in the reactor system. In addition, the excellant heat transfer properties of sodium results in an improved thermal efficiency for the reactor's power conversion system.

The core and the pool of liquid sodium are contained within a large reactor vessel. The reactor vessel is in turn concentrically surrounded by a separate containment vessel. In between the reactor and containment vessels is an airtight annular gap. This gap is filled with an inert gas such as argon.

It is exceedingly important that the integrity of the reactor vessel be maintained. If the reactor vessel is breached, the radioactive core material may be released into the outside environment. This core material is exceedingly hazardous. It is therefore essential that any fractures in the reactor vessel be quickly discovered. In a liquid sodium type reactor, fractures in the reactor vessel may be discovered by monitoring the amount of sodium which is present in the annular gap between the reactor and containment vessels. Since the gap is normally filled exclusively with an inert gas, any sodium that may be present must come from within the reactor vessel. This can only occur if the reactor vessel's structural integrity has been compromised. Monitoring the concentration of sodium level within the gap will lead to the detection of any cracks in the reactor vessel.

There are many events which may lead to rupture of the reactor vessel. Some of these events, such as an earthquake, present an obvious need to inspect the reactor vessel's integrity. Other causes of damage are more subtle. Even at low reactor power, with low pressure on the liquid sodium and with negligible pressure induced stresses, the high radiation environment and high temperature environment along with local temperature gradients may lead to the formation of cracks. These events can occur at any time, without advance warning or any overt indications beforehand. Periodic monitoring for cracks is unacceptable since the cracks may form between the inspection periods. It is therefore desirable to have an efficient method of continuously monitoring the amount of sodium present in the annular gap.

In prior art systems, the concentration of sodium in the gaseous media was measured intrusively. For example, sodium atoms may be ionized in the gas and the concentration of sodium ions measured by physically removing samples from the annular gap. The presence of sodium may also be detected by monitoring the physical properties such as thermal conductivity, electrical conductivity and density, of the gas at various locations within the gap. However, all of these techniques for the detection of sodium leaks are undesirable as they require breaches in the containment vessel, or placement of active sensors within the vicinity of the reactors. All of these methods introduce additional safety hazards to an already dangerous environment.

SUMMARY OF THE INVENTION

The present invention overcomes the aforementioned difficulty by providing a non-obtrusive method of detecting sodium leaks from the reactor vessel. The present invention utilizes a fiber optic system to optically measure the amount of sodium vapor in the gap. A light source is placed in the containment vessel and projected onto the reactor vessel. The reflected light is then analyzed with an absorption spectrometer. The presence of any sodium vapor along the optical path will result in a change of the optical transmissivity of the media. Since the absorption spectrum of sodium is well known in the art, the light source is chosen such that the sensor is responsive only the presence of sodium molecules. The optical sensor is designed to be small and require a minimum of amount of change to the structure of the reactor containment vessel.

DETAILED DESCRIPTION OF THE INVENTION

An apparatus and method for detecting leaks in a liquid metal cooled nuclear reactor is disclosed. Throughout the following description numerous details such as specific temperatures and sensor arrangements are set forth in order to provide a more thorough understanding of the present invention. In other instances, well known elements such as fiber optic cables and lenses are not described in detail so as not to obscure the present invention unnecessarily.

Throughout the following description, the present invention is described with reference to the detection of sodium vapor. Sodium is used in the preferred embodiment because it is presently the preferred metal for liquid metal cooled nuclear reactors. However, it will be apparent to those skilled in the art that the present invention can be adapted to detect the presence of other elements. To detect other elements it is only necessary to change the wavelength of the light which is projected into the gap between the reactor and containment vessels. Furthermore, the present detection system is described for particular application to nuclear reactors. It will be also be apparent to those skilled in the art that the present invention can be used to detect the presence of sodium (or other elements) in many different applications.

Figure 1:
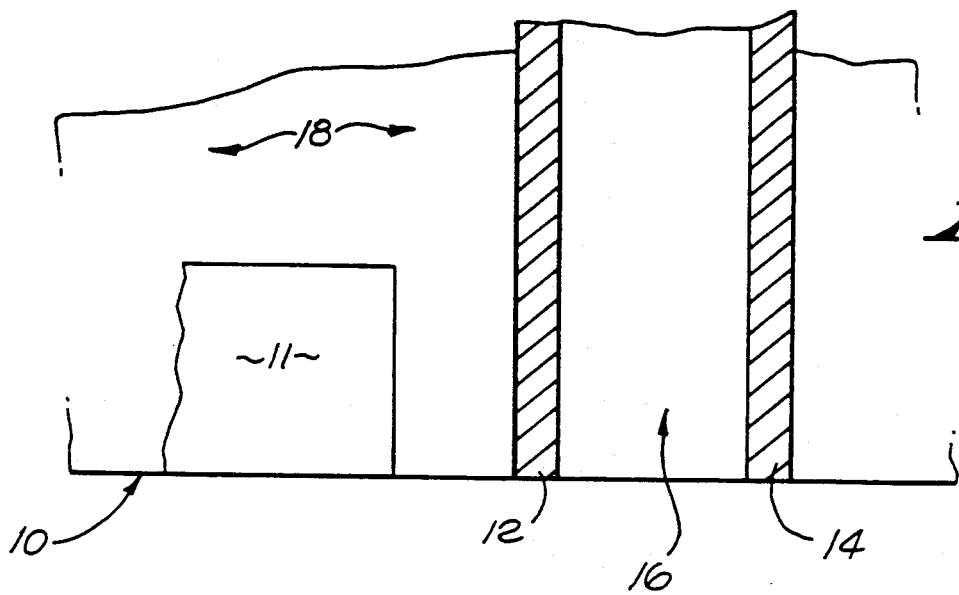
FIG. 1 illustrates, in cross-sectional view, the major structural elements of a liquid sodium cooled nuclear reactor.

Referring first to FIG. 1, a cross-sectional view of a liquid sodium cooled nuclear reactor is shown. The reactor 10 consists of a radioactive core 11 surrounded by a pool of liquid sodium 18. The core is contained within a reactor vessel 12 that is typically cylindrical in shape. Concentrically surrounding the reactor vessel 12 is a containment vessel 14. The containment vessel is separated from the reactor vessel 12 by a predetermined distance thus creating annular gap 16. The gap 16 is typically filled with an inert gas. In the preferred embodiment, argon is used. However, it will be apparent to those skilled in the art that different types of gases, such as nitrogen, may be used. The gap is separated from the outside environment and the sodium inside the reactor vessel 12 by an airtight seal. Thus, the presence of any sodium in the gap indicates that there is a rupture in the reactor vessel. The present invention detects sodium leaks in order to continuously monitor the integrity of the reactor vessel.

Figure 2:
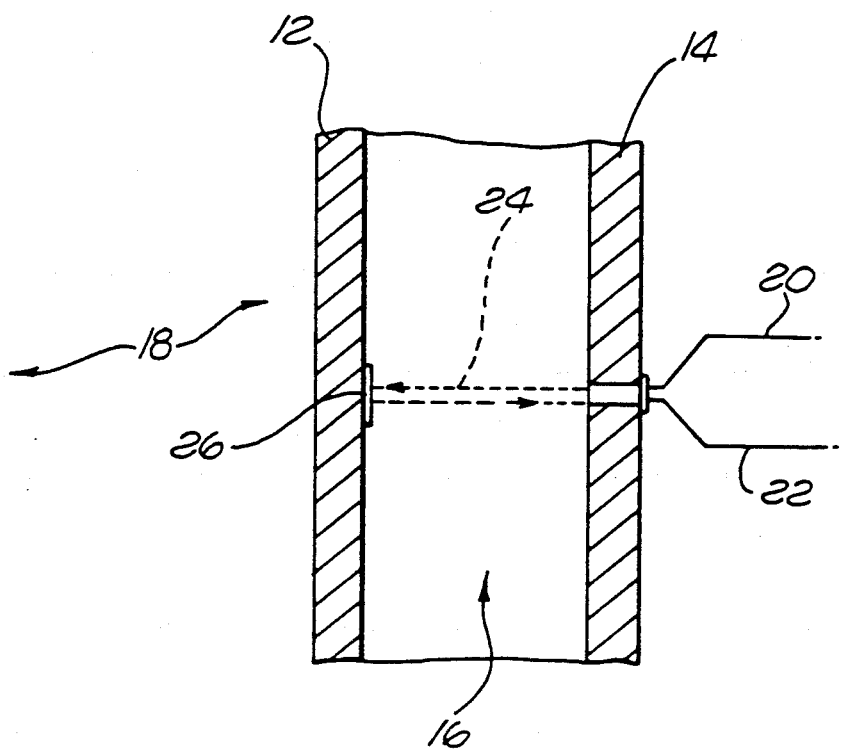
FIG. 2 schematically illustrates the optical apparatus of the present invention.

Referring next to FIG. 2, a schematic representation of the basic elements of the present invention is shown. The detection principle that is utilized by the present invention is based on measurement of the concentration of sodium vapor in gap 16 through absorption spectroscopy. A sensor assembly is placed within the wall of the containment vessel, exposed to the inert gas. In the preferred embodiment, the sensor consists of a fiber optic connector 22. A fiber optic cable 20 is couples the connector to a light source (not shown in FIG. 2). The light source supplies a light beam with two dominant wavelengths to the sensor. One of the wavelengths is chosen so as to coincide with the absorption line of sodium gas. The second wavelength is used as a reference light source. The light beam travels through the cable 20 to the connector 22 where it is projected through the gap 16 and reflected off the wall of the reactor vessel 12. This is indicated in FIG. 2 by the optical path 24 of the light beam. If there is no sodium present in the optical path 24 there will be no change in the transmissivity of the light. If, however, sodium is present then the transmissivity will change. This change is directly related to the concentration of sodium along the optical path 24. By measuring the absorption of the sodium wavelength and comparing it against the reference wavelength, the presence of sodium—and hence a reactor leak—can be detected.

Figure 3:
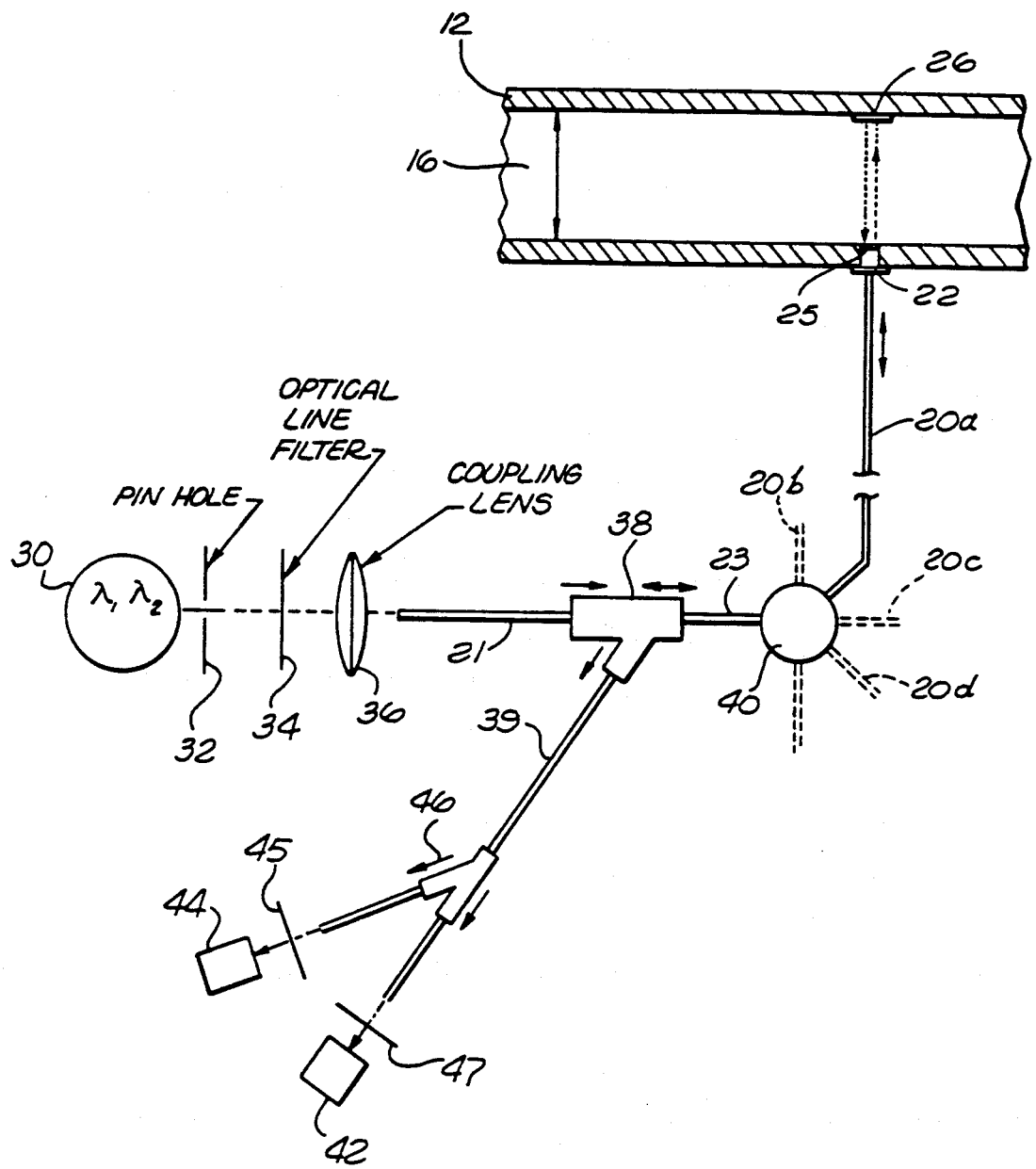
FIG. 3 illustrates the present invention's optical sodium leak detection sensor system attached to the containment vessel.

Referring next to FIG. 3, a more detailed illustration of the components of the detection system are shown. A light source 30 generates a light beam having the desired optical characteristics. In the preferred embodiment, a sodium/rubidium spectral lamp is used. Sodium radiates at 5189 Å which coincides with the sodium absorption line, and the rubidium provides a light source not absorbed by either argon or sodium. A pinhole 32, optical line filter 34, and coupling lens 36 are used to focus and condition the light source and transmit the light beam into the fiber optic cable 21. The light beam travels through cable 21 through directional fiber optics junction 38 and into multiplexer 40.

It will be apparent to those skilled in the art that the light source need not be limited to these specific wavelengths or type of lamp. For example, a laser may be used to generate the light beam if desired. Also, the wavelengths which predominate in the light beam can be varied if it is necessary to detect different elements. If an inert gas other than argon is used in the gap between the vessels, then the reference wavelength can be changed so that it is not absorbed by the gas.

To reduce the overall cost of the detection system, the preferred embodiment utilizes only one light source 30 and two detectors 42 and 44. A multiplexer 40 is incorporated into the design so that a large number of sensors may be placed on the containment vessel. As will be described, a large number of sensors allows the location of a leak, as well as its mere presence to be detected. Each sensor is connected to the multiplexer 40 by a fiber optics cable 20. In FIG. 3, several sensors are shown connected to the multiplexer through fiber optic cables designated by numerals 20a, 20b, 20c, etc.

In the preferred embodiment, each sensor is comprised of a fiber optics connector 22 embedded in the containment vessel. The connector is capable of accepting the light beam from the fiber optics cable 20, and projecting it into the gap 16 between the containment and the reactor vessels. After the light beam is reflected off of the outside surface of the reactor vessel, the connector gathers the reflected light and directs it back into fiber optics cable 20. The structure of these connectors is well known in the art. The sensor also includes a graded index rod lens 25 to focus the light on the reactor vessel. If desired, a reflector may be attached to the reactor vessel 12 in order to direct more energy back to the fiber optics cable 20.

The directional fiber optic junction 38 separates the reflected light from the light supplied by the light source 30. The junction 38 is constructed such that when light is travelling from left to right (as shown in FIG. 3) the light enters the junction at opening 38a and exits at opening. However, when the light is travelling from right to left (as shown in FIG. 3) its direction is changed and it travels from opening 38b to opening 38c. The collected light exits the junction 38 and travels through fiber optics cable 39 to beam splitter 46. Beam splitter 46 separates the collected light into two separate beams. In the preferred embodiment, the light is split into two beams of equal intensity. The two light beams are further directed through line filters 45 and 47. Each filter separates out one of the wavelengths of the light beam. Finally, the filtered light beams are supplied to the photo-detectors 42 and 44. Each of the photo-detectors are responsive to only one wavelength in the light source. If there is any sodium present in the gap 16, the detector which is sensitive to the wavelength of sodium will record a light beam of less intensity than the other photo-detector.

A correlation can be carried out for the respective intensities measured by each of the photo detectors to determine the amount of sodium present in the gap 16. This correlation is performed on a microprocessor or similar device. The system is calibrated before use by passing the light beam through gasses having a known concentration of sodium vapor. This calibration data is then used by the microprocessor to actually measure the amount of sodium in the gap.

Figure 4:
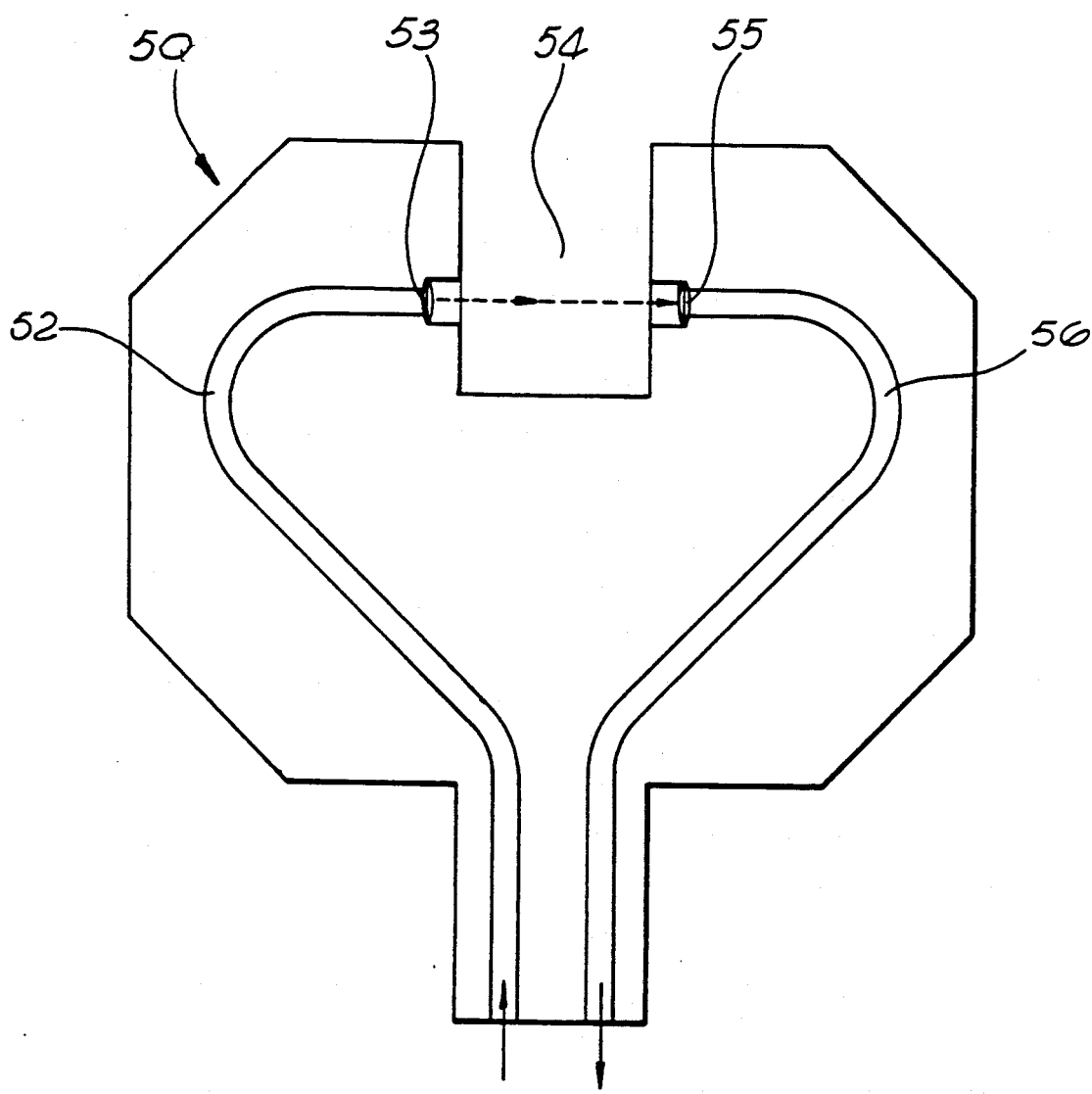
FIG. 4 illustrates an alternative embodiment of the present invention's optical sodium vapor sensor.

FIG. 4 illustrates an alternative embodiment for the sensor assembly. This emobodiment may be used when structural or other considerations preclude the use of the reflector method of the preferred embodiment. In this alternative embodiment, a sensor 50 integrally contains a pair of input-output fibers arranged in a loop 52. The input and output fibers connect to cable 20 as with the preferred embodiment of the sensor. The alternative sensor 50 also contains a small gap 54. The sensor measures the amount of sodium present while monitoring the transmission of the light across the gap 54. Light enters the input cable 52, travels through a graded index rod lens 53, and is transmitted across gap 54 through the outside environment. The light beam is then collected and focused by lens 55 and routed back to the cable 20 through output fiber 56. The alternative embodiment of the sensor head is particularly advantageous where measurements must be taken in small areas.

Regardless of the sensor design which is used, in all cases the light sources and all optical components and signal processing electronics will be located remotely from the reactor site. The only component near the reactor vessel are the sensors themselves and the connecting fiber optic cables. This will ensure proper processing of the data and minimize any risk of damage to the reactor vessel. The preferred embodiment, the distance between the containment vessel and the reactor vessel is approximately 4 to 8 inches. The present design of the sensor assembly allows the monitoring system to detect sodium concentration as small as 10 parts per billion (ppb). The sensitivity of the detector may be varied by changing the optical path length of the light beam through the gaseous media. A longer path length will increase the sensitivity since the light will be exposed to more sodium atoms. Similarly, a shorter path length will reduce the sensitivity of the sensor assembly. Extending the light path is difficult because the distance between the containment and reactor vessel is fixed. However, multiple reflectors can be used so that the light travels between the two vessels a number of times before it is collected by the sensor. The path can be shortened by either extending the connector into the containment vessel or by placing the reflecting surface a short distance from the lens. For the alternative embodiment, the sensitivity of the sensor can be changed simply by changing the width of the gap 54.

The present invention is not limited to the use of only one sensor. As noted above, with reference to FIG. 3, a multiplexer 40 is employed in order to allow several sensors to be used with present invention. The sensors are placed at strategic locations around the reactor vessel. Since any leak through the wall of the reactor vessel will occur in a specific location, the sensor which is closest to the leak will be first to detect the concentration of any sodium as the sodium spreads throughout the gap 16. The initial detection of sodium by a single sensor will indicate the presence of a leak. As the sodium spreads, more and more sensors will detect its presence. The processing unit will analyze the data presented by the sensors to fix the location of the leak. The rate at which the sodium spreads throughout the gap 16 gives an accurate measurement of the concentration of the sodium, and hence the intensity of the leak. Thus, the system of the present invention is able to provide the location and intensity of a leak as well as its mere presence.

Accordingly, a sodium leak detection method has been disclosed. In the foregoing specification the present invention has been described with respect to certain specific embodiments. It will be appreciated by those skilled in the art that various verifications and adaptations may be made in the described embodiments without departing from the broader spirit and scope of the present invention therefore, the foregoing specification is to be regarded in an illustrative rather than restrictive sense. The scope of the invention is therefore limited only by the following claims.

What is claimed is:

1. A device for detecting sodium leaks from a reactor vessel of a liquid sodium cooled nuclear reactor said reactor vessel being concentrically surrounded by a a containment vessel so as to define an airtight gap containing argon, comprising;
   a light source for generating a first light beam, said first light beam having first and second predominant wavelengths, said first wavelength being substantially equal to an absorption line of sodium and said second wavelength being chosen such that it is not absorbed by sodium and argon;
   an optical multiplexer optically coupled to said light source;
   a plurality of sensors optically coupled to said multiplexer, each of said sensors being embedded in said containment vessel of said reactor, each of said sensors projecting said first light beam into said gap and collecting said first light beam after it has reflected off of a surface of said reactor vessel;
   a beam splitter optically coupled to each of said sensors through said multiplexer; said beam splitter splitting said first light beam into second and third light beams of substantially equal intensities;
   a first filter dispersed within a path of said second light beam for filtering said first wavelength out of said second light beam and a second filter disposed within a path of second light beam for filtering said second wavelength out of said third light beam;
   first and second detector beams disposed with in the paths of said second and third light beams so as to detect the intensities of said second and third light beams, respectively; and
   processing means connected to said first and second detector means for calculating the amount of said first wavelength which is absorbed when passing through said argon.

2. The device of claim 1 wherein said processing means comprises a microprocessor.

3. The device of claim 1 wherein said sensor further comprises a reflector coupled to said outer surface of said reactor vessel.

4. A method of detecting sodium leaks from a liquid sodium cooled nuclear reactor comprising the steps of:
   projecting a first light beam into a gap between a containment and reactor vessels of said reactor, said light beam comprising first and second predominant wavelengths, said gap being airtight and containing an inert gas;
   reflecting said first light beam off of an outer surface of said reactor vessel;
   collecting said reflected first light beam;
   splitting said first light beam into second and third light beams;

filtering said first wavelength from said second light beam and filtering said second wavelength from said third light beam;

comparing the intensities of said filtered second and third light beams so as to detect the presence of sodium.

5. The method of claim 4, wherein said first wavelength is substantially equal to the absorption line of sodium and said second wavelength is chosen such that it is not absorbed by sodium or said inert gas.

6. The method of claim 4 wherein said inert gas is argon.

* * * * *